United States Patent
Omichinski

(10) Patent No.: US 6,713,005 B2
(45) Date of Patent: Mar. 30, 2004

(54) METHOD OF FORMING A COMPOSITE STRUCTURE OF EXPANDABLE MATRIX AND A REINFORCING MEDIUM

(75) Inventor: Gerald Mitchell Omichinski, Portage la Prairie (CA)

(73) Assignee: The Boeing Company, Chicago, IL (US)

( * ) Notice: Subject to any disclaimer, the term of this patent is extended or adjusted under 35 U.S.C. 154(b) by 137 days.

(21) Appl. No.: 10/079,633

(22) Filed: Feb. 19, 2002

(65) Prior Publication Data

US 2002/0135094 A1 Sep. 26, 2002

Related U.S. Application Data

(62) Division of application No. 09/520,852, filed on Mar. 7, 2000, now Pat. No. 6,379,762.

(51) Int. Cl.[7] .................. B29C 53/56; B29C 53/84; B29C 70/08; B29C 70/14
(52) U.S. Cl. ............... 264/102; 264/134; 264/136; 264/257; 264/258
(58) Field of Search ..................... 264/134, 136, 264/257, 258, 101, 102, 45.5, 46.5, 46.4, 294, 339, 349; 428/36.3, 36.5, 36.91, 113, 114, 319

(56) References Cited

U.S. PATENT DOCUMENTS

| | | | |
|---|---|---|---|
| 3,927,504 A | * 12/1975 | Forrister | 53/430 |
| 4,130,614 A | * 12/1978 | Saidla | 264/46.4 |
| 4,550,547 A | * 11/1985 | Wagner, Sr. | 53/430 |
| 4,994,316 A | 2/1991 | Browne et al. | |
| 5,089,207 A | * 2/1992 | Hammond et al. | 264/257 |
| 5,234,757 A | 8/1993 | Wong | |
| 5,312,848 A | * 5/1994 | Klapper et al. | 521/172 |
| 5,376,322 A | * 12/1994 | Younessian | 264/148 |
| 5,397,611 A | 3/1995 | Wong | |
| 5,529,731 A | 6/1996 | Bendick et al. | |
| 5,654,518 A | 8/1997 | Dobbs | |
| 5,660,901 A | 8/1997 | Wong | |
| 5,665,461 A | 9/1997 | Wong et al. | |
| 5,776,579 A | 7/1998 | Jessup et al. | |
| 5,876,831 A | 3/1999 | Rawal | |
| 6,158,605 A | 12/2000 | DeLay | |
| 6,189,431 B1 | 2/2001 | Danner et al. | |
| 6,228,296 B1 | * 5/2001 | Cartmill et al. | 264/46.2 |

OTHER PUBLICATIONS

Advanced Composites, May/Jun. 1993, pp. 41–42.

* cited by examiner

Primary Examiner—Angela Ortiz
(74) Attorney, Agent, or Firm—Harness Dickey & Pierce P.L.C.

(57) ABSTRACT

A composite structure having first and second layers which are wrapped about one another to form a cylinder. The first layer is formed from an expandable film or foaming adhesive. The second layer is formed from a reinforcing member. The second layer is overlaid onto the first layer. The first and second layers are then rolled together in a jelly roll fashion. The roll is then cured to expand the film. The structure may thereafter be incorporated into a panel and drilled to receive a fastener. The composite structure is generally lightweight having a high compressive strength-to-density ratio. The physical properties of the composite structure may be tailored to a particular application. For example, the physical properties of the composite structure may be tailored to provide improved energy absorption or a reduced initial peak compressive strength. A method for forming a composite structure from an expandable film member and a reinforcing member is also provided.

17 Claims, 4 Drawing Sheets

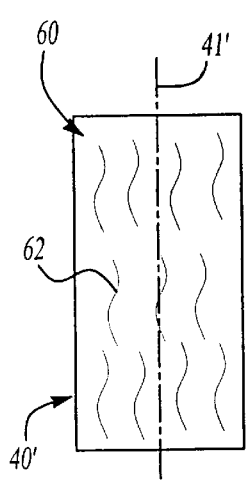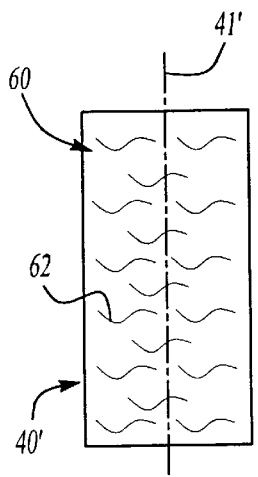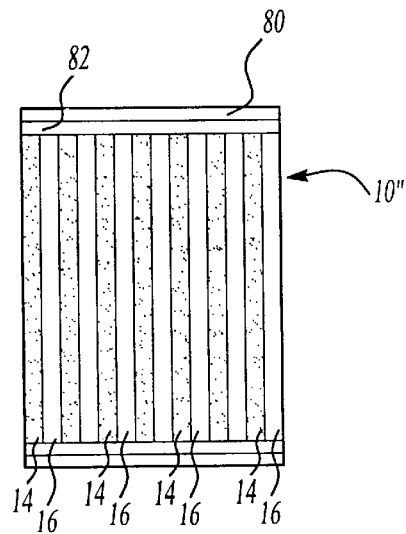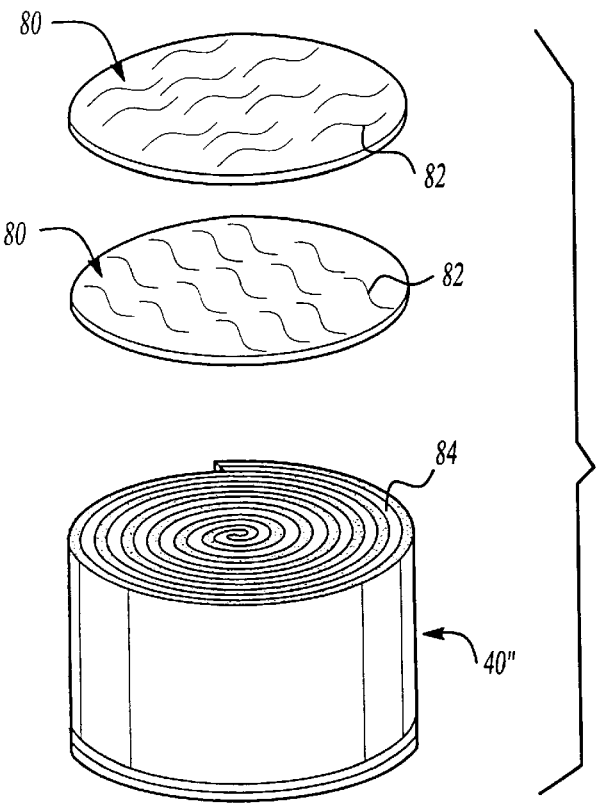

METHOD OF FORMING A COMPOSITE STRUCTURE OF EXPANDABLE MATRIX AND A REINFORCING MEDIUM

CROSS-REFERENCE TO RELATED APPLICATIONS

This is a divisional application of commonly assigned U.S. application Ser. No. 09/520,852 filed on Mar. 07, 2000, now U.S. Pat. No. 6,379,762, entitled Composite Structure of Expandable Matrix And A Reinforcing Medium.

TECHNICAL FIELD

The present invention relates generally to composite structures having a high strength-to-weight ratio and more particularly to a composite structure preferably formed with an expanding film/foam layer and a reinforcing member.

BACKGROUND OF THE INVENTION

Discussion

Composite panels formed from lightweight materials are commonly used throughout the aerospace industry for secondary structural applications, such as wing trailing edges, empenage close outs, wing-to-body fairings, strut fairings and access doors. Frequently, these panels are formed from sandwich constructions of relatively thin inner and outer layers of thermoset resin/fiber systems separated by a relatively thick layer of honeycomb core material. The skin materials provide strength and the core material provides stiffness to the composite panel. Although these structures are strong enough to support aerodynamic loading, they typically lack sufficient compression strength for the attachment of assembly details, such as access door hinges. Consequently, the core can crush if a fastener is mounted through it and the outer facesheets.

In such cases, the panels are selectively strengthened in the areas where increased compression strength is needed through the use of 'hard points'. The usual method of forming 'hard points' into a panel is through the use of a monolithic cylinder of potting compound that is incorporated into the panel. A typical potting compound is Epocast 1625 A/B by Ciba Specialty Chemicals.

The use of potting compounds, however, has several drawbacks. A first drawback concerns the density of these compounds. Typically, the potting compounds used for the monolithic inserts have a density of about 0.75 to about 2.00 grams/cubic centimeter. In comparison, the density of the honeycomb material is about 0.07 to about 0.25 grams/cubic centimeter. Accordingly, a considerable weight penalty accompanies the use of such potting compounds.

In the aerospace industry, there are design requirements for structures and materials that exhibit energy absorption. Examples of such structures are aircraft tail skids, helicopter landing gear assemblies and landing strut assemblies of interplanetary spacecraft. Generally speaking, it is highly desirable that materials used for absorbing impact energy provide sustained crush resistance over a defined distance of travel or crush stroke and have a high crush strength-to-density ratio. Additionally, the materials used for absorbing impact energy are frequently required to limit the maximum deceleration force during an impact and as such, the initial peak compressive strength exhibited by the panel is highly significant.

Frequently, structures designed for impact energy absorption use a honeycomb core of a lightweight material, such as aluminum, to provide the impact energy absorption. Examples of these cores are Spiralgrid by Alcore Incorporated and Tube-Core by Hexcel Corporation. However, the ratio of crush strength-to-density for these materials is typically low, generally being on the order of approximately 180 psi per pounds per cubic foot. Furthermore, the initial peak compression strength of these materials is not readily adjustable. Generally speaking, where lower initial peak compression strengths are required, a technique of pre-failing is employed wherein the material is loaded to a point beyond the initial peak compression strength.

SUMMARY OF THE INVENTION

The present invention preferably provides a composite structure having a high strength-to-weight ratio that can be fabricated at a relatively low cost. A preferred composite structure uses an expanded syntactic film.

The present invention entails a method for forming a structure having an syntactic film layer and a reinforcing layer.

In one form, a preferred embodiment of the present invention provides a composite structure having first and second layers which are wrapped about one another to form a cylinder. The first layer is formed from an expandable film or foaming adhesive. The second layer is formed from a reinforcing member. The second layer is overlaid onto the first layer. The first and second layers are then rolled together in a jelly roll fashion. The roll is then cured to expand the film. The structure may thereafter be incorporated into a panel and drilled to receive a fastener. A method for forming a composite structure from an expandable film member and a reinforcing member is also provided.

BRIEF DESCRIPTION OF THE DRAWINGS

Additional advantages and features of the present invention will become apparent from the subsequent description and the appended claims, taken in conjunction with the accompanying drawings, wherein:

FIG. 8 is a side elevation view of the composite structure of FIG. 7 illustrating the plurality of reinforcing fibers oriented in a first direction;

FIG. 9 is a side elevation view of the composite structure of FIG. 7 illustrating the plurality of reinforcing fibers oriented in a second direction;

FIG. 10 is a cross-sectional view of a composite structure constructed in accordance with the teachings of a second alternate embodiment of the present invention;

FIG. 11 is an exploded perspective view illustrating the use of several supplemental reinforcing members, each of which being rotated relative to the longitudinal axis of the composite structure;

DETAILED DESCRIPTION OF THE PREFERRED EMBODIMENT

Figure 1:
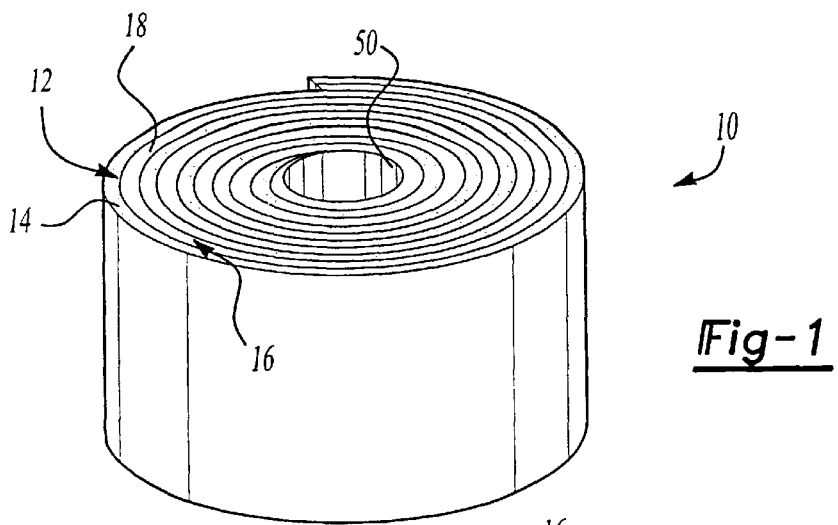
FIG. 1 is a perspective view of a composite structure constructed in accordance with the teachings of the present invention.

With reference to FIG. 1 of the drawings, a composite structure constructed in accordance with the teachings of the present invention is generally indicated by reference numeral 10. Composite structure 10 is shown to include a first layer 12 formed from an expandable film or foam (hereinafter film), such as a syntactic film 14, and a second layer 16 formed from a reinforcing member 18.

Figure 2:
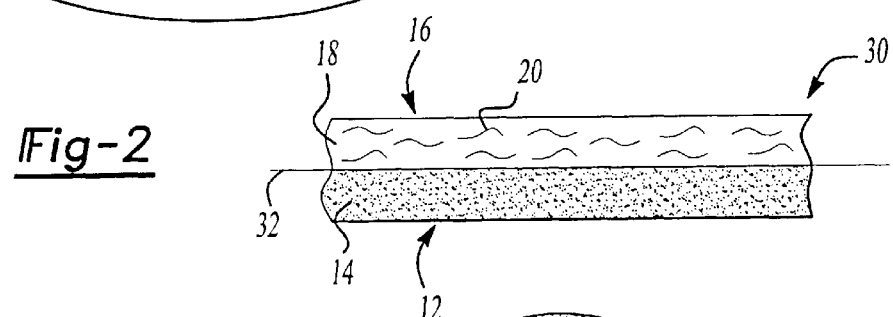
FIG. 2 is a side elevation view of a laminate member used in the construction of the composite structure of FIG. 1.

The syntactic film 14 is preferably a layer of Synspand® syntactic film by Dexter Corporation. A preferred film has a thickness of about 25 mils to about 200 mils and preferably has a thickness of about 50 mills to about 100 mils. Alternatively, the first layer 12 may be formed from an expandable foam such as FM 490A or FM 390 foaming adhesives by Cytec Industries, preferably having a thickness of about 25 to mills about 100 mils, and more preferably a thickness of about 25 mils to about 50 mils. Other factors which are relevant to the selection of the material for the syntactic film 14 include chemical compatibility with the reinforcing member 18, the amount by which the material will expand during curing and the mechanical properties of the material, including adhesive strength and shear strength, which will permit applied loads to be transferred to the reinforcing member 18. Preferably, the reinforcing member 18 is a tape having a plurality of oriented reinforcing fibers 20 (shown in FIG. 2), such as T6C190-12-F263-32 epoxy preimpregnated carbon tape by Hexcel Corporation having graphite fibers. Alternatively, the reinforcing member 18 may be any tape, fabric or yarn having graphite, fiberglass or other fibers which perform a reinforcing function. Those skilled in the art will understand that the reinforcing member 18 may be of a single layer or a series of sub-layers wherein the material forming the reinforcing member is layered upon itself.

Figure 3:
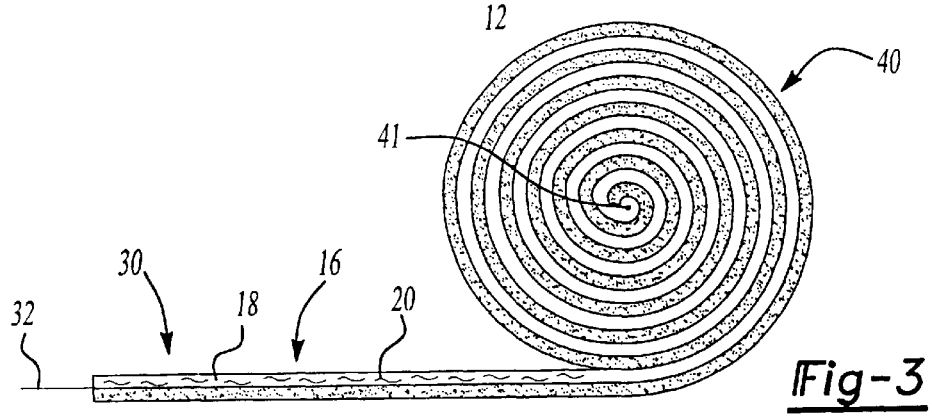
FIG. 3 is a side elevation view of the formation of the laminate roll-up used in the construction of the composite structure of FIG. 1.
Figure 4:
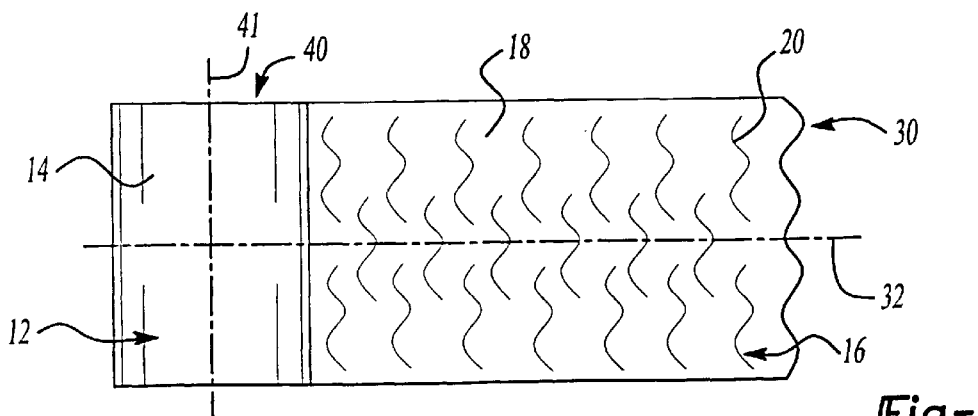
FIG. 4 is a plan view of the formation of a laminate roll-up similar to that of FIG. 3.
Figure 5:
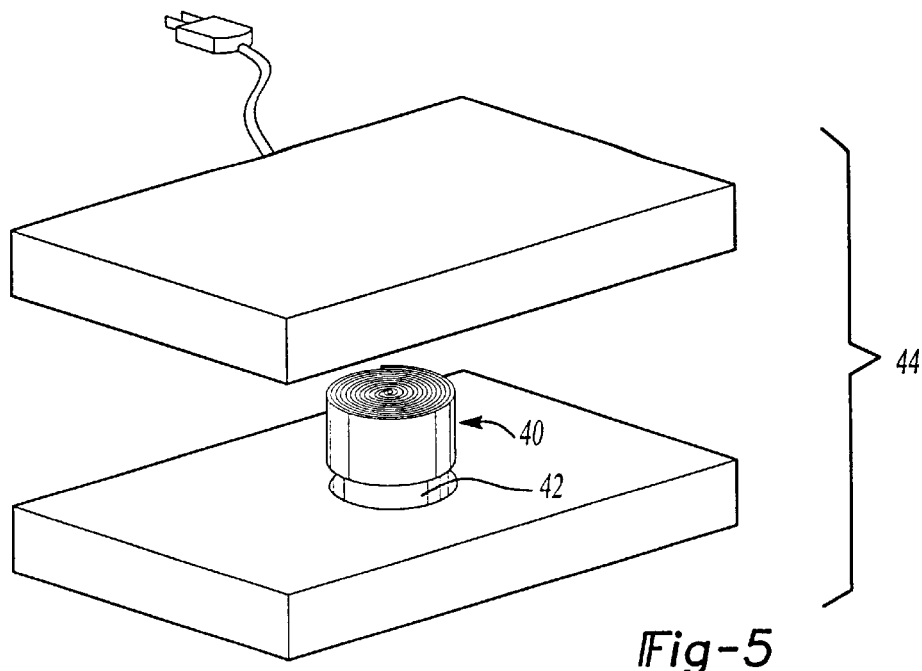
FIG. 5 is a perspective view of the laminate roll-up of FIG. 3 being inserted into a mold for curing.

With additional reference to FIGS. 2 through 6, the first and second layers 12 and 16 are initially flat and superimposed to one another. The syntactic film 14 is sufficiently tacky in the uncured state to adhere to the reinforcing member 18. The reinforcing member 18 is next overlaid onto the syntactic film 14 to form a laminate member 30. The reinforcing member 18 is preferably oriented to the syntactic film 14 such that the plurality of oriented reinforcing fibers 20 are oriented perpendicular to the longitudinal axis 32 of the laminate member 30 as shown in FIG. 4.

Alternatively, the reinforcing member 18 may be oriented at a predetermined angle relative to the syntactic film 14 to alter the physical characteristics (e.g., compressive strength) of composite structure 10. One example of this is illustrated in FIG. 3 where the reinforcing member 18 is oriented relative to the syntactic film 14 such that the plurality of oriented reinforcing fibers 20 are parallel to the longitudinal axis 32 of the laminate member 30.

Figure 6:
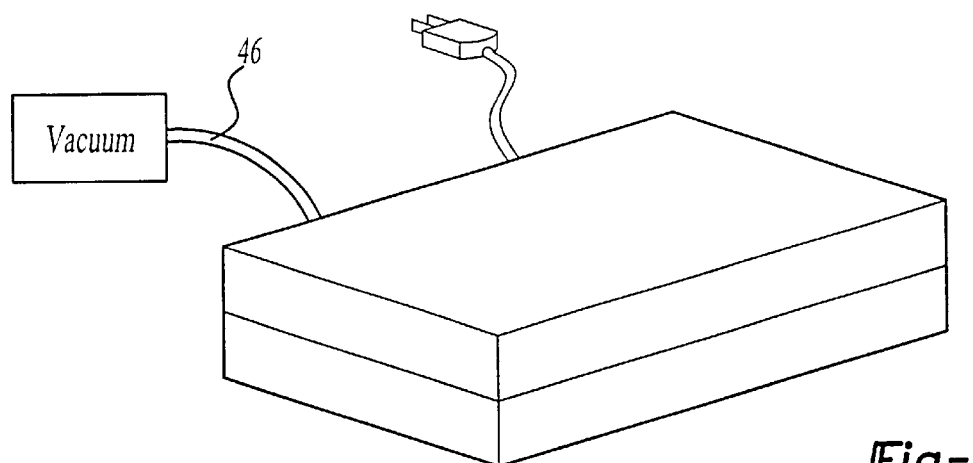
FIG. 6 is a perspective view of the laminate roll-up of FIG. 3 being cured in a mold.

The laminate member 30 is next rolled or wrapped onto itself along its longitudinal axis 32 to form a laminate roll-up 40 having a longitudinal axis 41. To initiate the wrapping process, a narrow strip of the syntactic film 14 may be placed along the width of the laminate member 30 at the end of the laminate member that will correspond to the center of the laminate roll-up 40. The resulting laminate roll-up 40 is generally cylindrical in shape, the end of which having a swirled appearance similar to that of a cinnamon or jelly roll. The laminate roll-up 40 is placed into a mold cavity 42 in a mold 44 (FIG. 5) and cured to expand the syntactic foam adhesive at an elevated temperature (FIG. 6). Due to the expanding nature of the syntactic film 14, it is important that air be permitted to escape from the mold 44 during the curing step. Depending upon the type of material used, it may also be beneficial to evacuate air from the mold 44 via a vacuum line 46, as when the FM 490A foaming adhesive by Cytec Industries is used for the syntactic film 14.

After the curing step has been completed, the composite structure 10 may be processed through conventional machining operations to prepare the composite structure 10 for a desired application. For example, the composite structure 10 may be cut to a desired length, inserted into and bonded to a predetermined location in a honeycomb core (not shown) and formed with the honeycomb core into a composite panel (also not shown). The panel may then be drilled through its depth at positions which have been reinforced with the composite structure 10 to receive a fastener (not shown). In isolation, the composite structure 10 will appear as shown in FIG. 1 with a clearance hole 50.

An alternate method for incorporating composite structure 10 into a panel includes the forming of the laminate roll-up 40 to predetermined dimensions and placing the un-cured laminate roll-up 40 into a cavity formed in the honeycomb core of a panel (not shown). The honeycomb core subassembly is then incorporated into a sandwich panel assembly with top and bottom plies of conventional composite resin preimpregnated materials. The entire assembly is then cured under conditions of heat and pressure. In this manner, the laminate roll-up 40, is co-cured with the resin preimpregnated materials, saving the processing step of curing separately in a mold. Subsequent operations of drilling to receive a fastener are similar in both methods of forming honeycomb core reinforcement.

The density of the composite structure 10 will vary depending the mold fill ratio (i.e., the ratio of the volume of the uncured laminate roll-up 40 to the volume of the mold cavity 42). Mold fill ratios ranging between about 60 percent to about 85 percent have provided composite structures 10 with densities ranging between about 0.40 grams/cubic centimeter to about 0.90 grams/cubic centimeter. Table 1, below, details several of the various physical properties of various configurations of the composite structure 10, as well as for various types of potting compounds.

TABLE 1

Physical Properties of Inserts

| Insert Construction | Density (g/cm³) | Compressive Strength (ksi) |
|---|---|---|
| Synspand (.050) with a double layer of carbon tape epoxy | 0.89 | 24.2 |
| Synspand (.050) with a single layer of carbon tape epoxy | 0.80 | 20.0 |
| Synspand (.100) with a single layer of carbon tape epoxy | 0.70 | 12.1 |
| Type 27 Potting Compound | 2.00 | 20.0 |
| Type 25 Potting Compound | 2.00 | 8.5 |

Figure 7:
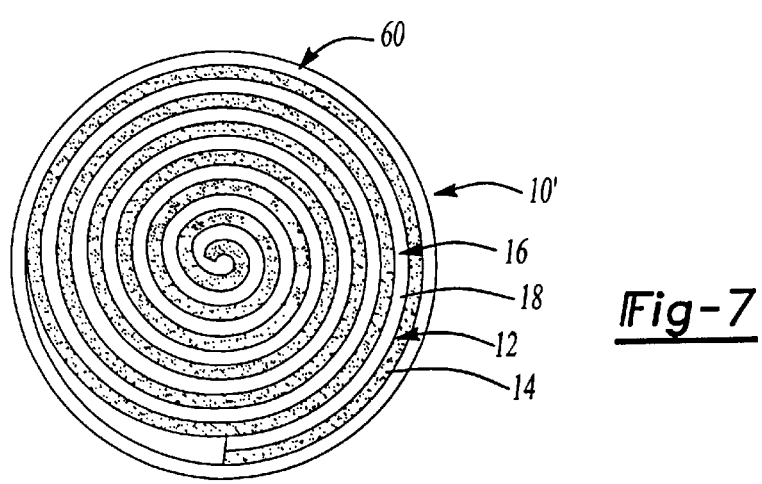
FIG. 7 is a top view of a composite structure constructed in accordance with the teachings of a first alternate embodiment of the present invention.

While the composite structure 10 has been described thus far as including a single reinforcing member which has been wrapped internally in a spiral manner, those skilled in the art will appreciate that the invention, in its broader aspects, may be constructed somewhat differently. A first example of an alternate construction is illustrated in FIGS. 7 through 9. Composite structure 10' is illustrated to be identical to composite structure 10 except for a second reinforcing member 60 which circles its perimeter.

Like reinforcing member 18, the second reinforcing member 60 is preferably formed from a tape having a plurality of oriented reinforcing fibers 62 (FIGS. 8 and 9), such as T6C190-12-F263-32 epoxy preimpregnated carbon tape by Hexcel Corporation having graphite (carbon) fibers. Alternatively, the reinforcing member 18 may be any tape, fabric or yarn having graphite, fiberglass or other fibers which perform a reinforcing function. Accordingly, those skilled in the art will understand that second reinforcing member 60 may be a separate and discreet from reinforcing member 18, or may be fixedly coupled to reinforcing member 18. Those skilled in the art will also understand that the second reinforcing member 60 may be of a single layer or a series of sub-layers wherein the material forming the second reinforcing member is layered upon itself.

The process for forming composite structure 10' differs from that of composite structure 10 in that before the laminate roll-up 40' is placed into the mold 44, the second reinforcing member 60 is wrapped around the perimeter of the laminate roll-up 40'. The second reinforcing member 60 is preferably oriented to the laminate roll-up 40' such that the plurality of oriented reinforcing fibers 62 are oriented perpendicular to the longitudinal axis 41' of the laminate roll-up 40' as shown in FIG. 8. Construction in this manner provides a composite structure 10' that is particularly well suited for applications involving impact energy absorption. The outside wrap localizes the initial failure to a narrow zone at one end of structure 10'. The remaining part of the structure remains in tact and continues to support load. As load is applied through the crush stroke, the fracture zone moves up the length of structure 10' as the outside wrap incrementally fractures. The specimen has an "unzipped" appearance after loading.

Alternatively, the second reinforcing member 60 may be oriented at a predetermined angle relative to the laminate roll-up 40' to alter the physical characteristics (e.g., compressive strength) of composite structure 10'. One example of this is illustrated in FIG. 9 where the second reinforcing member 60 is oriented relative to the laminate roll-up 40' such that the plurality of oriented reinforcing fibers 62 are parallel to the longitudinal axis 41' of the laminate roll-up 40'. Construction in this manner provides a composite structure 10' that is particularly well suited for applications requiring compression strength.

Accordingly, those skilled in the art will understand that reinforcing member 18 and second reinforcing member 60 will cooperately define the physical properties of structural insert 10'. As such, the orientations of reinforcing member 18 and second reinforcing member 60 need not be identical. Moreover, since second reinforcing member 60 may be formed from a plurality of sub-layers of the reinforcing material, each sub-layer need not be continuous with the previous sub-layer. By including sub-layers of multiple orientations, it is possible to further alter the physical properties of composite structure 10' to suit a given set of design criteria.

A second example of an alternate construction is illustrated in FIGS. 10 and 11. Composite structure 10" is shown to be constructed similarly to composite structure 10 except for the inclusion of one or more reinforcing discs 80. Each of the reinforcing discs 80 are preferably formed from a tape having a plurality of oriented reinforcing fibers 82, such as T6C190-12-F263-32 epoxy pre-impregnated carbon tape by Hexcel Corporation having graphite fibers.

The process for forming composite structure 10" differs from that of composite structure 10 in that before the laminate roll-up 40" is placed into the mold 44, the reinforcing disc 80 is placed to an end 84 of the laminate roll-up 40". After curing, the reinforcing disc 80 provides the composite structure 10" with characteristics that are similar to a washer disbursing axially directed point loads across a larger surface. These properties may be enhanced by the use of several reinforcing discs 80, with each disc 80 being rotated relative to an adjacent disc 80 to rotate the orientation of the plurality of oriented reinforcing fibers 82 (FIG. 11).

Figure 12:
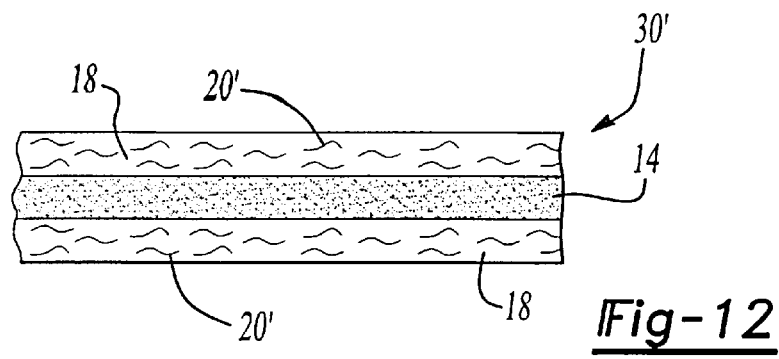
FIG. 12 is a side elevation view of a laminate member used in the construction of a composite structure constructed in accordance with the teachings of a third alternate embodiment of the present invention.

A third example of an alternate construction is illustrated in FIG. 12. In this embodiment, the laminate member 30 is replaced with laminate member 30'. Laminate member 30' is similar to laminate member 30 except that an additional reinforcing layer 18' is coupled to a second side of the syntactic film 14. Reinforcing layer 18' is preferably a tape having a plurality of oriented reinforcing fibers 20', such as T6C190-12-F263-32 epoxy preimpregnated carbon tape by Hexcel Corporation having graphite fibers. Alternatively, the reinforcing member 18' may be any tape, fabric or yarn having graphite, fiberglass or other fibers which perform a reinforcing function. Those skilled in the art will understand that the reinforcing member 18' may be of a single layer or a series of sub-layers wherein the material forming the reinforcing member is layered upon itself. Those skilled in the art will also understand that reinforcing layer 18' may be oriented relative to the syntactic film 14 at an angle that is different from reinforcing layer 18.

Figure 13:
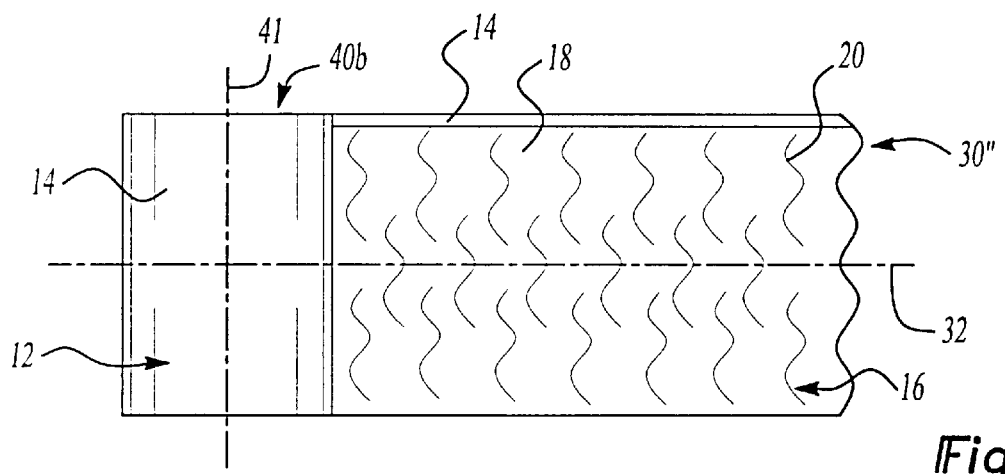
FIG. 13 is a plan view of the formation of a laminate roll-up used in the construction of a composite structure constructed in accordance with the teachings of a fourth alternate embodiment of the present invention.
Figure 14:
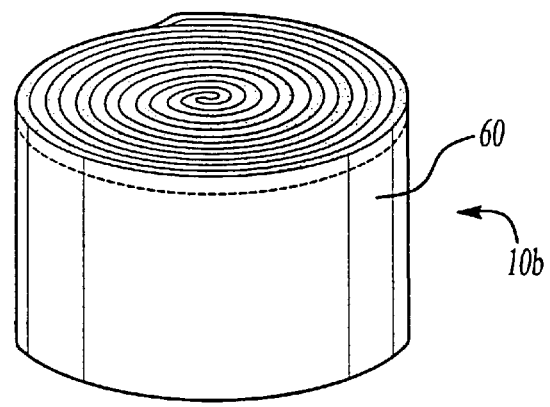
FIG. 14 is a perspective view of a composite structure constructed in accordance with the teachings of the forth alternate embodiment of the present invention.

A fourth example of an alternate construction is illustrated in FIGS. 13 and 14. In this embodiment, composite structure 10*b* is similar to composite structure 10' except that laminate member 30 is replaced with laminate member 30". Laminate member 30" is similar to laminate member 30 except that reinforcing member 18 has a width that is narrower than that of syntactic film 14. In this embodiment, reinforcing member 18 and syntactic film 14 are aligned to one another such that they are aligned on one side (e.g., the lower side) and offset to one another on the other side (the upper side). Laminate member 30" is then rolled to form laminate roll-up 40*b*, wrapped with a second reinforcing member 60 and cured as described above. Construction in this manner is desirable where it is necessary to limit or control the initial peak compression load in an impact energy absorbing design. By offsetting reinforcing member 18 while maintaining the width of the second reinforcing member 60 at the full height of the composite structure 10*b*, failure of the composite structure 10*b* initiates at a relatively lower load, thereby lowering the maximum deceleration force during an impact while maintaining the same energy absorbing crush strength over the crush stroke. Those skilled in the art will understand that the amount by which the failure load is lowered will be dependent upon the magnitude of the offset.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof.

Therefore, it is intended that the invention not be limited to the particular embodiments illustrated by the drawings and described in the specification as the best mode presently contemplated for carrying out this invention, but that the invention will include any embodiments falling within the foregoing description and the appended claims.

What is claimed is:

1. A method for forming a composite structure, the method comprising the steps of:

providing an expandable film member;

overlaying a reinforcing member on the expandable film member to form a laminate member with a longitudinal axis;

rolling the laminate member onto itself along the longitudinal axis to form a laminate roll-up; and curing the laminate roll-up to form a composite structure.

2. The method of claim 1, wherein before the curing step, the method further comprises the steps of:

providing a second reinforcing member, the second reinforcing member having a plurality of oriented reinforcing fibers; and wrapping the second reinforcing member around the laminate roll-up.

3. The method of claim 2, wherein the second reinforcing member is wrapped around the laminate roll-up such that the plurality of oriented reinforcing fibers are aligned generally parallel to a longitudinal axis of the laminate roll-up.

4. The method of claim 2, wherein the second reinforcing member is wrapped around the laminate roll-up such that the plurality of oriented reinforcing fibers are aligned generally perpendicular to a longitudinal axis of the laminate roll-up.

5. The method of claim 1, wherein the curing step includes the steps of:

inserting the laminate roll-up into a mold cavity;

applying a vacuum to the mold cavity; and curing the laminate roll-up in the mold cavity for a predetermined cure time.

6. The method of claim 1, wherein before the curing step, the method further comprises the steps of:

providing a second reinforcing member, the second reinforcing member having a plurality of oriented reinforcing fibers; and coupling a first side of the second reinforcing member to an end of the laminate roll-up such that the plurality of oriented reinforcing fibers in the second reinforcing member are aligned generally perpendicular to the longitudinal axis of the laminate roll-up.

7. The method of claim 6, wherein before the curing step, the method further comprises the steps of:

providing a third reinforcing member, the third reinforcing member having a plurality of oriented reinforcing fibers; and coupling the third reinforcing member to a second side of the second reinforcing member such that the plurality of oriented reinforcing fibers in the third reinforcing member are aligned generally perpendicular to the longitudinal axis of the laminate roll-up.

8. The method of claim 2, wherein the second reinforcing member is selected from a group consisting of graphite reinforced tape, graphite reinforced fabric, graphite reinforced yarn, fiberglass reinforced tape, fiberglass reinforced fabric and fiberglass reinforced yarn.

9. The method of claim 1, wherein the reinforcing member includes a plurality of oriented reinforcing fibers.

10. The method of claim 9, wherein the reinforcing member is selected from a group consisting of graphite reinforced tape, graphite reinforced fabric, graphite reinforced yarn, fiberglass reinforced tape, fiberglass reinforced fabric and fiberglass reinforced yarn.

11. The method of claim 9, wherein the oriented reinforcing fibers are aligned generally parallel to the longitudinal axis of the laminate roll-up.

12. The method of claim 9, wherein the oriented reinforcing fibers are aligned generally perpendicular to the longitudinal axis of the laminate roll-up.

13. The method of claim 1, wherein the expandable film member has a thickness of about 25 mils to about 200 mils.

14. The method of claim 1, wherein the expandable film member and the reinforcing member are wrapped about one another such that the reinforcing member is adjacent a longitudinal axis of the laminate roll-up.

15. The method of claim 7, wherein the oriented reinforcing fibers of the third reinforcing member are skewed to the oriented reinforcing fibers of the second reinforcing member.

16. The method of claim 7, wherein the third reinforcing member is selected from a group consisting of graphite reinforced tape, graphite reinforced fabric, graphite reinforced yarn, fiberglass reinforced tape, fiberglass reinforced fabric and fiberglass reinforced yarn.

17. The method of claim 6, wherein the second reinforcing member is selected from a group consisting of graphite reinforced tape, graphite reinforced fabric, graphite reinforced yarn, fiberglass reinforced tape, fiberglass reinforced fabric and fiberglass reinforced yarn.

* * * * *